United States Patent
Brown et al.

(10) Patent No.: US 8,547,480 B1
(45) Date of Patent: Oct. 1, 2013

(54) COORDINATING DISTRIBUTED GRAPHICS RENDERING IN A MULTI-WINDOW DISPLAY

(75) Inventors: Jeff Brown, Mountain View, CA (US); Mathias Agopian, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/532,752

(22) Filed: Jun. 25, 2012

(51) Int. Cl.
*H04N 5/50* (2006.01)
(52) U.S. Cl.
USPC ........................................................ 348/500
(58) Field of Classification Search
USPC ................. 348/500, 563, 569, 725, 552–553; 725/44, 40, 51, 46, 43, 152, 63, 68
See application file for complete search history.

(56) References Cited

U.S. PATENT DOCUMENTS

| | | | |
|---|---|---|---|
| 6,911,984 B2 | 6/2005 | Sabella et al. | |
| 7,012,606 B2 | 3/2006 | Swedberg et al. | |
| 7,034,837 B2 | 4/2006 | Sadowski et al. | |
| 7,071,944 B2 | 7/2006 | MacInnis et al. | |
| 7,538,783 B2 | 5/2009 | MacInnis et al. | |
| 8,004,542 B2 | 8/2011 | Tanaka et al. | |
| 8,107,010 B2 * | 1/2012 | Putterman et al. | 348/563 |
| 8,120,621 B1 * | 2/2012 | Ogrinc et al. | 345/629 |
| 8,159,617 B2 * | 4/2012 | Neal | 348/678 |
| 8,269,857 B2 * | 9/2012 | Ishizaka | 348/231.2 |
| 8,347,088 B2 * | 1/2013 | Moore et al. | 713/166 |
| 2003/0217369 A1 * | 11/2003 | Heredia | 725/152 |
| 2004/0210847 A1 * | 10/2004 | Berson et al. | 715/788 |
| 2010/0095319 A1 * | 4/2010 | Tran et al. | 725/14 |
| 2011/0032986 A1 * | 2/2011 | Banger et al. | 375/240.07 |
| 2011/0218994 A1 * | 9/2011 | Holladay et al. | 707/737 |
| 2012/0144286 A1 * | 6/2012 | Bank et al. | 715/230 |

* cited by examiner

*Primary Examiner* — Paulos M Natnael
(74) *Attorney, Agent, or Firm* — McDonnell Boehnen Hulbert & Berghoff LLP

(57) ABSTRACT

Multi-window display operations may be optimized in an electronic device. The electronic device comprises a screen that may be operable to provide a multi-window display by enabling configuring of a plurality of display regions, where video content corresponding to one or more of the plurality of applications is displayed in each of the plurality of display regions. Optimizing multi-window display operations may comprise monitoring updates of video content for each of the plurality of display regions of the screen, and generating a frame comprising video content for all of the plurality of display regions when one or both of the following occurs: all pending video content updates are completed and a frame generation deadline is reached.

15 Claims, 4 Drawing Sheets

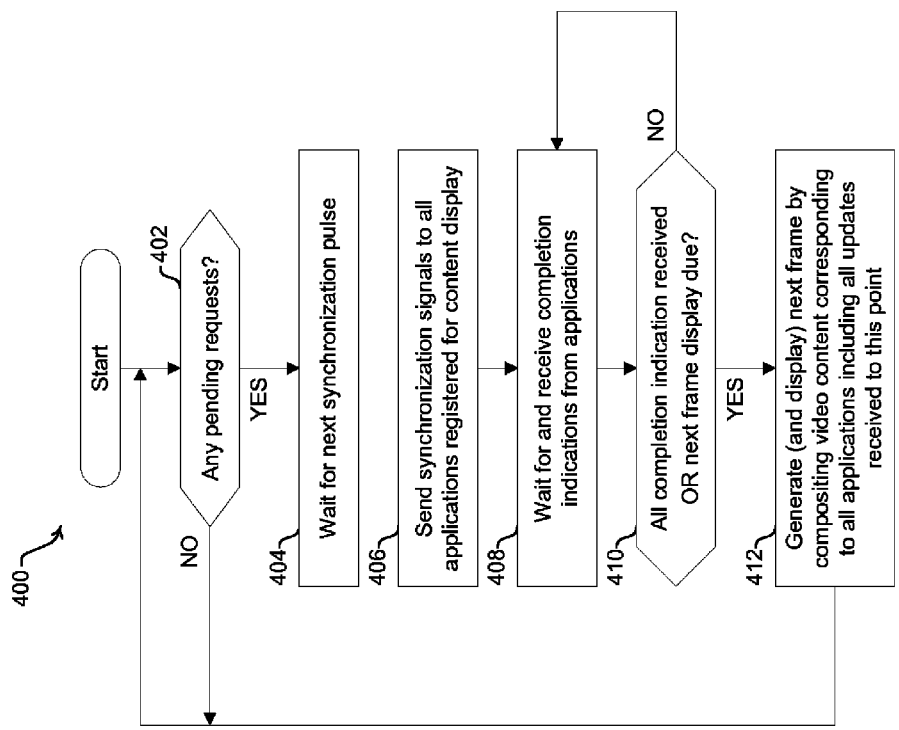

COORDINATING DISTRIBUTED GRAPHICS RENDERING IN A MULTI-WINDOW DISPLAY

TECHNICAL FIELD

Aspects of the present disclosure relate to communications. More specifically, certain implementations of the present disclosure relate to a coordinating distributed graphics rendering in a multi-window display.

BACKGROUND

Various devices can be used nowadays in displaying video content, which may comprise still and/or moving images. Such video display devices may comprise dedicated display devices, such as televisions (TVs), and/or devices with display capabilities, such as smartphones, tablet devices, laptops, personal computers (PCs), and/or industrial (or medical) devices with display screen for outputting data. The video display devices may display video content comprising locally generated content, content obtained from local sources, and/or content obtained from remote sources. In this regard, locally obtained video content may comprise content read from storage means, such as video content that may have been previously stored into Digital Video Discs (DVDs) and/or Blu-ray discs, and subsequently read therefrom using corresponding player devices, such as stand-alone DVD or Blu-ray players and/or optical disc drives (ODDs) integrated into or coupled to PCs or laptops. Video content obtained from remote sources may comprise content communicated and received via television broadcasts and/or broadband (e.g., Internet) telecasts or streams. Furthermore, in addition to video content obtained from remote or local sources, displayed video content may comprise content generated within or by the devices, such as video content corresponding to applications or programs executed by or on the devices. Additionally (or alternatively), content may be associated with use of video interactive interfaces, such as with use of computers, smartphones, and/or game-console/video games, and as such the video content may be interactively generated. In some instances, video display devices may be used to concurrently display multiple video contents.

Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY OF THE DISCLOSURE

A system and/or method is provided for coordinating distributed graphics rendering in a multi-window display, substantially as shown in and/or described in connection with at least one of the figures, as set forth more completely in the claims.

These and other advantages, aspects and novel features of the present disclosure, as well as details of illustrated implementation(s) thereof, will be more fully understood from the following description and drawings.

BRIEF DESCRIPTION OF SEVERAL VIEWS OF THE DRAWINGS

FIG. 4 is a flow chart that illustrates process for performing coordinating distributed graphics rendering in a multi-window display.

DETAILED DESCRIPTION

The present disclosure relates to a method and system for a method and system for dedicated security processor for handling secure transactions in a handheld communication device. In various implementations, an electronic device, which may comprise a display and a plurality of applications running on the electronic device, may support enhanced multi-window display operations. The enhanced multi-window display operations may comprise displaying in each of a plurality of regions of the display, video content corresponding to one or more of the plurality of applications, monitoring updates of video content for each of the plurality of regions of the display, and generating a frame comprising video content for all of the plurality of regions when all pending video content updates are completed or when a frame generation deadline is reached. Reaching the frame generation deadline may be determined based on expiry of timer, wherein the timer may be configurable. In some instances, number of the pending video content updates may be determined based on tracking of a number of messages issued to one or more of the plurality of applications, to authorize performing video content updates thereby. The issued messages may comprise vertical synchronization (VSync) signals. The one or more of the plurality of applications that may be authorized to perform video content updates may be determined based on previously received request(s) to register for video content updates from the one or more of the plurality of applications.

In some instances, completion of pending video content updates may be determined based on reception of completion notifications from one or more of the plurality of applications performing updates of video content. In this regard, it may be determined that all pending video content updates are completed when number of the completion notifications from one or more of the plurality of applications performing updates of video content is equal to a number of content update authorization messages sent to the one or more of the plurality of applications.

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "block" and "module" refer to functions than can be performed by one or more circuits. As utilized herein, the term "e.g.," introduces a list of one or more non-limiting examples, instances, or illustrations.

Figure 1:
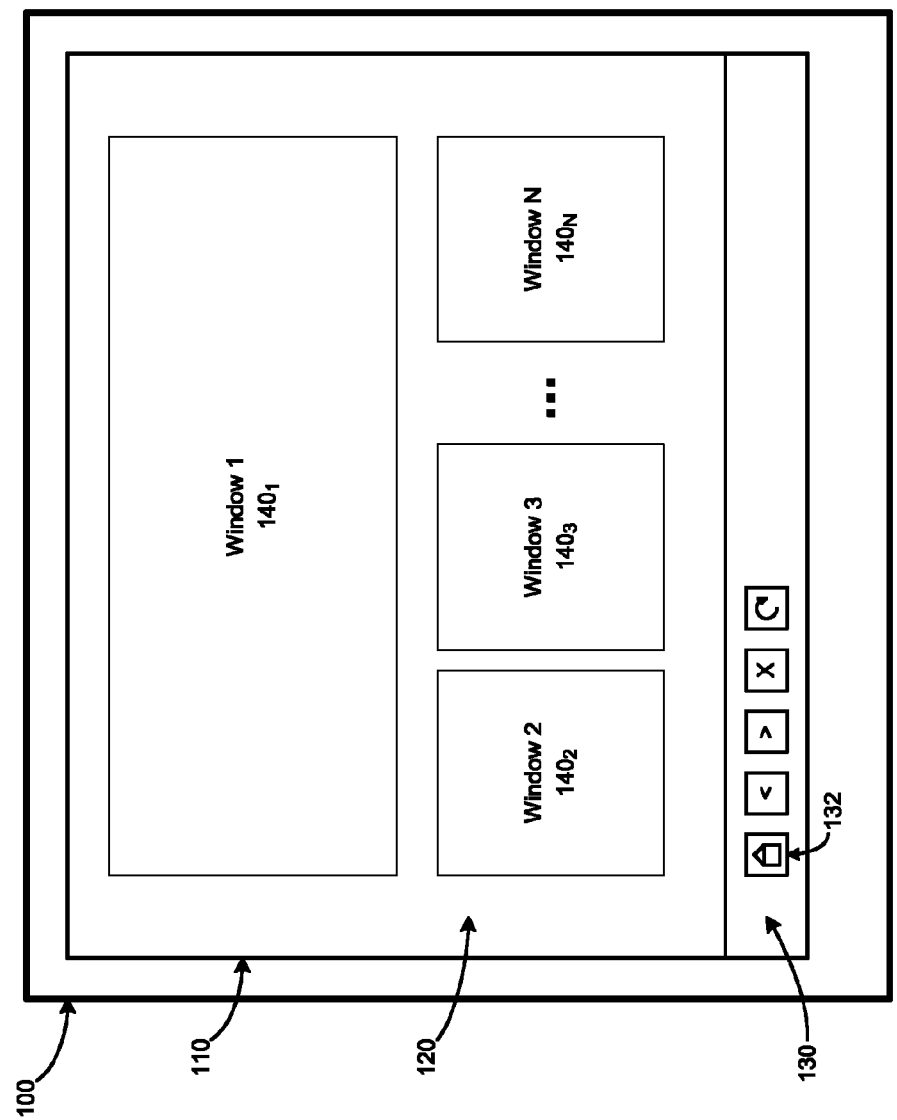
FIG. 1 is a block diagram illustrating an electronic device that comprises multiple-window display.

FIG. 1 is a block diagram illustrating an electronic device that comprises multiple-window display. Referring to FIG. 1 there is shown an electronic device 100.

The electronic device 100 may comprise suitable logic, circuitry, interfaces, and/or code that may be operable to handle and/or run various applications and/or programs. In this regard, executing applications and/or programs by the electronic device 100 may be based on user instructions and/or pre-configured instructions. In some instances, the electronic device 100 may be operable to communicate data via wired and/or wireless connections, in accordance with one or more supported wireless and/or wired protocols or standards. Examples of electronic devices may comprise cellular phones, smartphones, tablets, laptop computers, desktop or personal computers, televisions, personal media players, and/or other similar devices which may process, generate and/or output data. The disclosure, and/or any implementation(s) in accordance therewith, however, are not limited to any particular type of electronic devices.

The electronic device 100 may comprise a display 110, which may be used in outputting video or graphical data. In this regard, the display 110 may be utilized to display video content, which may comprise still and/or moving (stream of) images. The video content may comprise or correspond to input data read from storage device or received via broadcast or transmission to the electronic device; user interaction data, such as use menus or other graphic user interface (GUI) like functions; control related information, such as status or error related data; and/or data generated by and/or in conjunction with applications or programs run or executed by or on the electronic devices.

In some instances, the display 110 may be operable to support multi-window display operations. In this regard, multi-window display operations may comprise configuring multiple display regions, which may used to concurrently display a plurality of video contents. The number and/or distribution of display regions may be configurable, such as based on user input and/or predetermine preferences, and/or may be dynamically adjusted during display operations. For example, the display 110 may be configured to include a background region 120, a user control region 130, and a plurality of windows $140_1$-$140_N$. In this regard, the video content display in each of the display regions may be generated and/or determined separate from the remaining regions. For example, the background region 120 may be utilized to display content in part of the screen that is covered or occupied by remaining regions. The user control region 130 may be used as a region for displaying user interface elements 132, which may enable user interactions, such entering particular commands and/or triggering specific actions and/or functions that may be utilized for navigation and/or operation of electronic device 100, and/or the display 110, regardless of what's being displayed in the remaining display regions. For example, the display user interface elements 132 may comprise a user interface element for returning to a "home" screen, user interface elements for moving forward or ahead (e.g., in a series of available screens), a user interface element for closing a current screen, and/or a user interface element for reloading the current screen. The plurality of windows $140_1$-$140_N$ may correspond to display regions that may be allocated to particular applications and/or functions in the electronic device 100 which may entail generating and/or outputting video content. In this regard, the electronic device 100 may be operable to execute and/or run a plurality of applications and/or programs, with at least some of the applications or programs being run or executed at the same time. For example, each of the windows $140_1$-$140_N$ may be assigned to one or more applications that are executing and/or running in the electronic device 100, to display video content with the corresponding one or more applications. Accordingly, displaying video via the display 110 may comprise generating video frames comprising video contents corresponding to each of the regions of the display 110—e.g., the background region 120, the user control region 130, and the plurality of windows $140_1$-$140_N$. In this regard, video content corresponding to each of these regions may be separately and/or autonomously generated and/or updated by applications, functions, or programs associated with each particular region. The video contents may then be combined (or composited) into a single frame that is displayed via the display 110.

Generating output video frames may be performed at particular intervals, which may correspond to the device frame rate—typically expressed as frames per second (FPS). The frame rate may be determined and/or set based on various criteria or parameters, including, for example and without limitation, the display refresh rate, which dictates how often a screen is refreshed—i.e., "repainted" with video data. Typical refresh rates for commonly utilized displays may be in the 50-100 Hz—that is the screen may be repainted 50-100 times per second. In this regard, displaying video or graphics at the applicable refresh rate may comprise reading from a particular video buffer, video data that may be used in generating a display frame, which may be used in drawing the screen thus resulting in creating corresponding visual effects via the screen. Accordingly, frames may be generated at appropriate intervals, such as by correlating to the display refresh rate, to ensure that the video data used in painting the screen is available when needed. This may be achieved by setting or adjusting the frame rate—i.e., the frequency at which display frames are generated to "publish" video contents—based on the display refresh rate, such as by synchronizing the frame rate to the applicable display refresh rate.

Synchronizing the frame rate to the display refresh rate may be achieved by various means. For example, frame rate synchronization may be performed by the use of vertical synchronization (VSync) signals (or pulses), which may typically be utilized in synchronizing and controlling the various display related operations or functions. In this regard, VSync signals or pulses may correspond to interrupts generated or triggered in accordance with the display refresh rate (e.g., 60 times per second when the display refresh rate is 60 Hz) to enable display related hardware and/or software to perform display related operations and/or functions, which may include generating the frames that would be displayed. In other words, determining when to generate frames from corresponding video content may be tied to triggering of VSync pulses in the electronic device 100. With single window environment—i.e., when the whole screen is allocated to publishing video content originating from and/or pertaining to a single source or application—this may simply comprise reading video content of that single source (or application) from a buffer where that video content is maintained at some particular point between consecutive screen repaints, and using that video content to generate the next display frame which may then be used in repainting the screen at the next refresh instance.

Where multi-window display operation is being utilized, however, the frame generation entails more control and/or processing, because there may be different video contents—e.g., corresponding to the different regions and/or applications—and frame generation may comprise compositing graphics and video contents corresponding to the different windows (i.e., the different display regions) into a single frame. In this regard, each of the pertinent video contents that may be composited to generate the single display frame may potentially be generated or updated at different instance—i.e., each of the applications associated with one or more display regions (windows) may generate and/or update the video content(s) of the corresponding display windows at any time. Therefore, generating multi-window based frames may require some measure of control and/or dependency on content generation and/or updating by the corresponding applications. For example, multi-window frame generation may be initiated when VSync signals are triggered, and may comprise copying the pertinent video contents (corresponding to the different windows), whenever they become ready, into a buffer to composite a corresponding single display frame, and then when the next VSync pulse arrives displaying the composited frame.

Because displaying frames may require additional functions and/or operations, beside compositing the frame, there is typically a deadline of particular interval prior to the next frame, to allow for these additional functions and/or operations. Thus, generating the next display frame may be statically fixed to ensure that the next frame is ready regardless of when the video content updates and the corresponding memory reads are completed. In other words, the composition function may make the conservative assumption that display updates performed by individual applications generating video content for the different screen regions would complete generating or updating the video content within the span of a single display frame. Thus, applications would be triggered at the beginning of a display frame, such as based on use of VSync signals, to start drawing their corresponding video content, and then on the beginning of the next display frame the content updates may be published to the display hardware. Accordingly, such composition approach may typically exhibit a display lag, of at least one frame since the video content updating is triggered at each frame—or display thereof—and the publishing of the content updates may not occur until the next frame at the earliest.

In various implementations, graphics rendering via regions of a display, such as the various regions of the display 110— e.g., the background region 120, the user control region 130, and the plurality of windows 140₁-140ₙ—may be coordinated in a manner that enable enhancing and/or optimizing video content display operations. In this regard, the composition function may be configured to dynamically track expected video content updates, such that frame generation or updates may be performed as soon as all content updates are completed, which may enable displaying the modified frames sooner—e.g., without having to wait until the statically set next frame display event as determined by the next VSync trigger event. Dynamic tracking of content updates (or generation) may comprise determining applications that are associated with display operations (and display window assignment thereto), and tracking thereafter applications determined to have pending content updates.

For example, the determining, and tracking thereafter, of applications with pending content updates may be based on counting the number of synchronization pulses that have been issued at the beginning of a particular frame. In other words, the display function may be configured to issue to applications associated with one or more of the display windows synchronization pulses at the beginning of frame period (e.g., just after the most recent refresh event). Furthermore, determining how many applications have completed generating or updating the corresponding video content may be done by counting the number of responses (or similar messages) received from applications which indicate that the application(s) may have completed the video content update. When the count of outstanding applications—i.e., those who received synchronization pulses but not yet responded with completion indication—reaches zero the video composition may be initiated to combine all current content updates by generating a corresponding frame that may then be display. In some implementations, the video composition may alternatively be triggered by a particular event even when the number outstanding applications does not reach zero. For example, the video composition may be triggered by a timer expiry event—i.e., when a timeout occurs. In this regard, the timer may be configured such as to allow for the minimum required time for performing the composition, and any required processing thereafter, to ensure that the next display frame is ready for the next display event.

Figure 2:
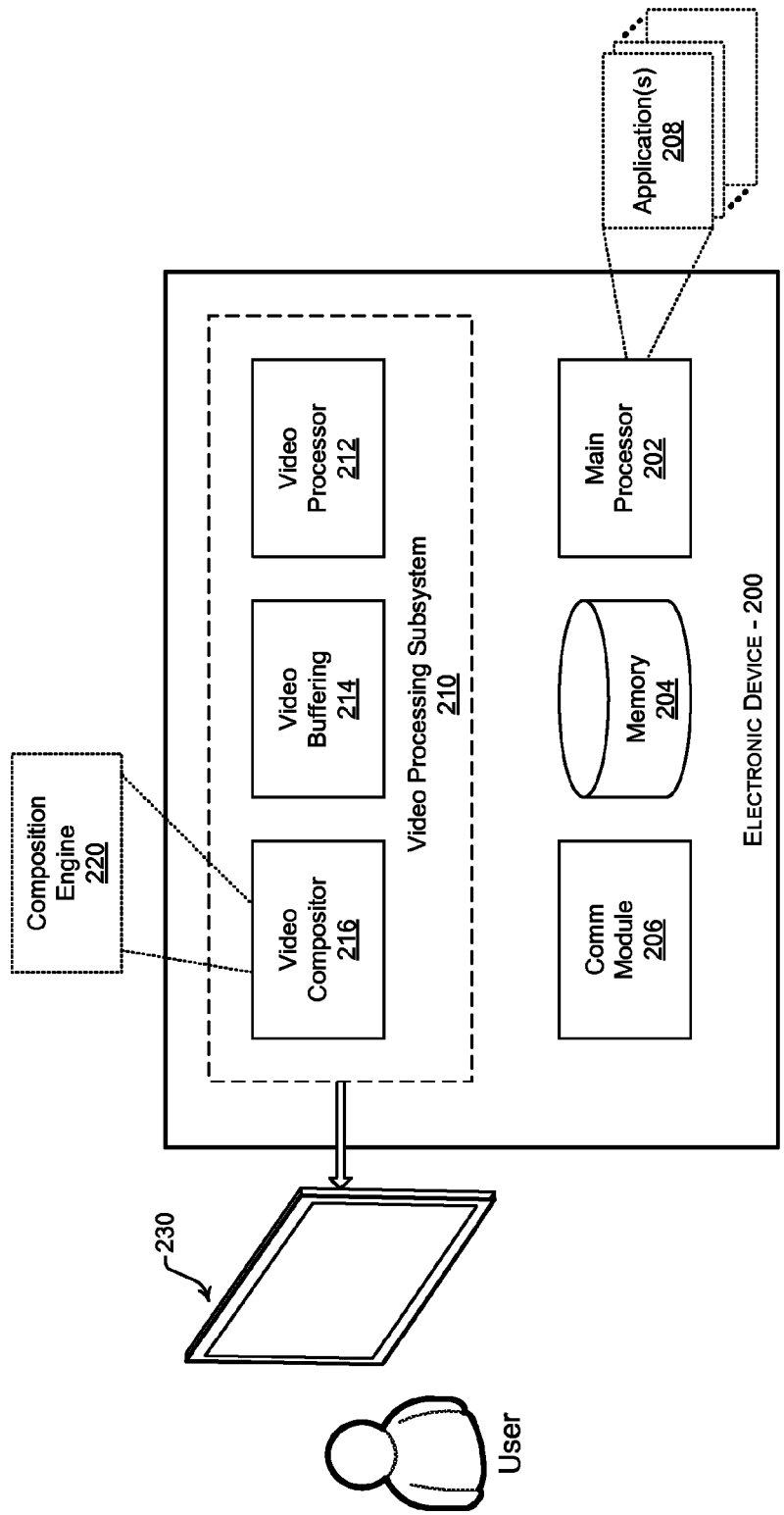
FIG. 2 is a block diagram illustrating an electronic device that enables coordinated graphic rendering in multiple windows display operations.

FIG. 2 is a block diagram illustrating an electronic device that enables coordinated graphic rendering in multiple windows display operations. Referring to FIG. 2 there is shown an electronic device 200.

The electronic device 200 may comprise suitable logic, circuitry, interfaces, and/or code that may be operable to implement various aspects of the disclosure. In this regard, the electronic device 200 may correspond to the electronic device 100 of FIG. 1. The electronic device 200 may comprise, for example, a main processor 202, a system memory 204, a communication module 206, a video processing subsystem 210, and a display 230.

The main processor 202 may comprise suitable logic, circuitry, interfaces, and/or code that may be operable to process data, and/or control and/or manage operations of the electronic device 200, and/or tasks and/or applications performed therein. In this regard, the main processor 202 may be operable to configure and/or control operations of various components and/or subsystems of the electronic device 200, by utilizing, for example, one or more control signals. The main processor 202 may enable running and/or execution of applications, programs and/or code, which may be stored, for example, in the system memory 204. Alternatively, one or more dedicated application processors may be utilized for running and/or executing applications (or programs) in the electronic device 200. In some instances, the applications running and/or executing on the electronic device 200 may comprise a plurality of applications 208, which may generate and/or update video content that may be rendered via the display 230.

The system memory 204 may comprise suitable logic, circuitry, interfaces, and/or code that may enable permanent and/or non-permanent storage, buffering, and/or fetching of data, code and/or other information, which may be used, consumed, and/or processed. In this regard, the system memory 204 may comprise different memory technologies, including, for example, read-only memory (ROM), random access memory (RAM), Flash memory, solid-state drive (SSD), and/or field-programmable gate array (FPGA). The system memory 204 may store, for example, configuration data, which may comprise parameters and/or code, comprising software and/or firmware.

The communication module 206 may comprise suitable logic, circuitry, interfaces, and/or code operable to communicate data from and/or to the electronic device, such as via one or more wired and/or wireless connections. The communication module 206 may be configured to support one or more wired protocols (e.g. Ethernet standards) and/or wireless protocols or interfaces (e.g., Bluetooth, WiFi, cellular, WiMAX, and/or any available wireless protocol/interface), facilitating transmission and/or reception of signals to and/or from the electronic device 200, and/or processing of transmitted or received signals in accordance with applicable wired or wireless protocols. In this regard, signal-processing operations may comprise filtering, amplification, analog-to-digital conversion and/or digital-to-analog conversion, upconversion/down-conversion of baseband signals, encoding/decoding, encryption/decryption, and/or modulation/demodulation.

The video processing subsystem 210 may comprise suitable logic, circuitry, interfaces and/or code that may enable generating and/or processing of video content, and/or generating video frames based thereon for display, via the display 230 for example. In some instances, the video processing subsystem 210 may support coordinated graphics rendering during multi-window display operations, substantially as described with respect to FIG. 1. The video processing subsystem 210 may comprise, for example, a video processor 212, a video buffering module 214, and a video compositor 216.

The video processor 212 may comprise suitable logic, circuitry, interfaces and/or code that may be operable to perform video processing operations on input video data (or content), to facilitate generation of corresponding output video data, which may be played via, for example, the display 230. For example, the video processor 212 may be operable to perform de-noising, de-blocking, restoration, deinterlacing and/or video sampling. In some instances, the video processor 212 may also perform decoding and/or decompression, such as when the input video data is received in encoded and/or compressed format. This may be achieved directly via the video processor 212 and/or via separate, dedicated video decoder component.

The video buffering module 214 may comprise suitable logic, circuitry, interfaces and/or code that may be operable to buffer video content during processing of video data and/or generation of output video data (frames) for display. In this regard, the video buffering module 214 may be utilized to buffer video content corresponding to different screen regions in the display 230, which may be combined via the video compositor when generating video frames that are displayed via the display 230.

The video compositor 216 may comprise suitable logic, circuitry, interfaces and/or code that may be operable to generate output video data (frames) for display based on video content received, handled, and/or processed via the video processing subsystem 210. The video compositor 216 may also perform additional video processing operations, to ensure that generated output video steams may be formatted to suit the display 230. In this regard, the video compositor 216 may be operable to perform, for example, motion estimation and/or compensation, frame up/down-conversion, cropping, and/or scaling. In some instances, the video compositor 216 may be operable to generate and/or configure display frames that correspond to multi-window display operations. In this regard, the video compositor 216 may be operable to combine video contents corresponding to a plurality of display regions into single display frames. In this regard, the video contents utilized in generating the display frames may initially be copied into the video buffering module 214, and copied from there by the video compositor 216 when generating the corresponding display frames.

In some instances, a composition engine 220 may be incorporated into the electronic device 200 for managing video composition operations, such as during use of multi-window display operations. For example, the composition engine 220 may manage and/or handle interactions with applications generating and/or updating video content that may be composited into single output frames during multi-window display operations. In some implementations in accordance with the present disclosure, the composition engine 220 may be configured to enhance management and/or control of video composition operations, to enable expediting publishing of video content for example. The composition engine 220 may be implemented as software component (function) of the video compositor 216. Alternatively, the composition engine 220 may comprise a dedicated hardware and/or software component of the electronic device 200.

The display 230 may comprise suitable logic, circuitry, interfaces and/or code that may enable displaying of video content, which may be handled and/or processed via the video processing subsystem 210. In some instances, the display subsystem 230 may comprise a screen that may be configured for supporting multi-window display operations, in which multiple display regions may be configured to enable concurrently displaying a plurality of video contents. The number and/or distribution of display regions may be configurable, such as based on user input and/or predetermine preferences, and/or may be dynamically adjusted during display operations.

In operation, the electronic device 200 may support multi-window display operations. In this regard, display frames may be generated from a plurality of video contents, corresponding to a plurality of display regions (windows). For example, at least some of the video contents may be associated with, or originate from one or more of the applications 208. In this regard, one or more of the applications 208 may be assigned with one or more display regions of the display 230. Such assignments need not be one-to-one. In other words, an application 208 maybe assigned multiple display regions, and/or a display region may be associated with more than one application 208. During multi-window display operations, display frames may be generated periodically, with each display frame comprising current video contents as available at the set time of frame publishing for example. In this regard, a typical composition operation makes the conservative assumption that since content updates performed by the applications 208 for the different screen regions may occur at any point during the frame duration, thus publishing the content updates is delay by at least one frame. Thus, applications 208 would be triggered at the beginning of a display frame, to start drawing their corresponding video contents, and then on the beginning of the next display frame the content updates may be published. Thus, a conservative composition approach may typically exhibit a display lag of at least one frame since the video content updating is triggered at each frame.

In various implementations, graphics rendering via regions (windows) of display 230 when operating in multi-window display mode, may be coordinated in a manner that enable enhancing and/or optimizing video content display operations. In this regard, the composition engine 220 may dynamically track expected video content updates, to enable performing the frame generation as soon as all content updates are completed, thus enabling displaying the modified frames sooner—e.g., without having to wait until the statically configured next frame display event. Dynamic tracking of content updates may comprise determining applications (208) that are associated with display operations and/or window-applications assignments, and tracking thereafter applications determined to have pending content updates. For example, the composition engine 220 may determine and track applications with pending content updates based on counting the number of synchronization (e.g., VSync) pulses that have been issued at the beginning of a particular frame.

The composition engine 220 may thereafter determine how many applications have completed generating or updating the video content by counting the number of responses or indications received from applications that may be sent when the applications complete the video content update. When the composition engine 220 determines that there are no more pending updates, the composition engine 220 may trigger video composition via the video compositor 216, to combine all current content updates by generating a corresponding frame that may then be display. In some instances, the composition engine 220 may also track a particular event for triggering video composition regardless of the number of pending content updates. For example, the composition engine 220 may trigger video composition based on timer expiry event—i.e., when a timeout elapses. In this regard, the timer may be configured such as to allow minimum required time for performing the video composition, and any required processing thereafter, before the next frame display event.

In some implementations, the composition engine 220 may be configure to determine when content updates indirectly—i.e., without requiring the applications 208 to send messages or responses when the content updates are complete. In this regard, after sending the synchronization pulses to trigger starting the content updates, the composition engine 220 may implicitly determine that the content updates are finished. One such implicit approach may rely on the monitoring activities of the applications that signify completion of the content updates. For example, applications post the updated content after the completing the updates—e.g., by sending the content or link to (or address of) where it may be buffered to the video processor 212, to enable processing of the video content for display thereof. Accordingly, the composition engine 220 may piggyback the determination of when the content updates are complete to the applications' posting of the updates or by sending messages to other components (in a typical manner) to notify these components of the completion of the updates.

Figure 3:
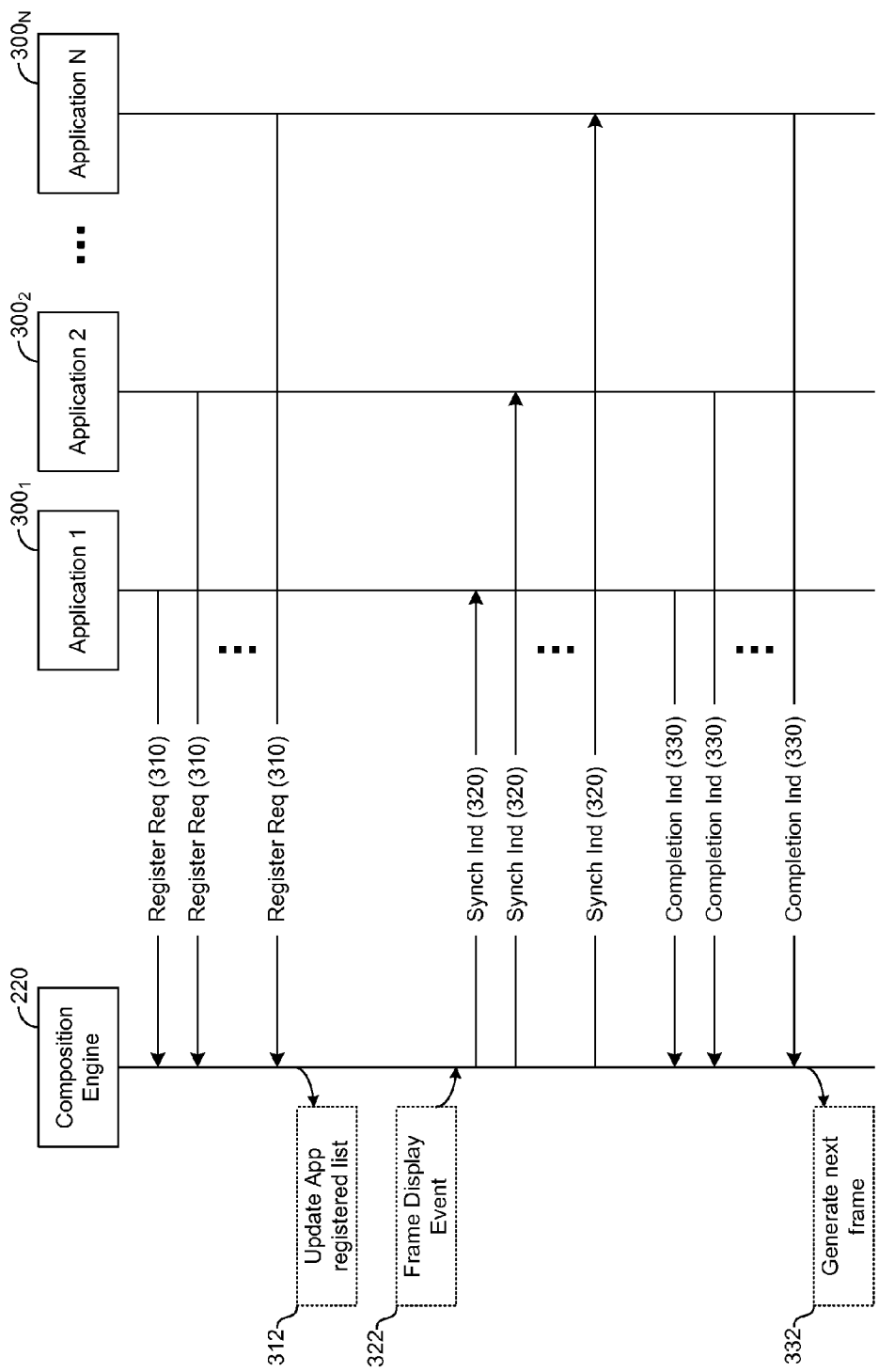
FIG. 3 is a diagram that illustrates a messaging sequence during coordinated graphic rendering in multiple windows display operations.

FIG. 3 is a diagram that illustrates a messaging sequence during coordinated graphic rendering in multiple windows display operations. Referring to FIG. 3, there is shown a messaging flow chart that shows interactions between the composition engine 220 and a plurality of applications $300_1$-$300_N$ during multi-window display operations. The applications $300_1$-$300_N$ may comprise applications or programs that may generate and/or update video content, which may be utilized in generating output display frames. In this regard, each of the applications $300_1$-$300_N$ may be associated with one or more display regions (windows).

In operation, the composition engine 200 may manage and/or handle interactions with the applications $300_1$-$300_N$ during display operations, to enable coordinating distributed graphics rendering in a multi-window display environment. In this regard, the composition engine 200 may interact with the applications $300_1$-$300_N$ to enable generating display frames when all pending content updates rather than statically waiting until the next display event regardless of when all updates are complete. Determining which applications participate in multi-window display operations may be performed based on a registration procedure, by which the applications may send register request messages (310) to register an interest in generating (or updating) video content corresponding to one or more display regions (windows). For example, register request messages (310) may specify interest in receiving synchronization pulses, which may be triggered at the beginning of each display frame. The composition engine 220 may update or populate (312) an application registration list based on received register request messages (310). In this regard, the application registration list may identify each application $300_X$ that sent register request messages (310), thus registering an interest in updating video content.

At the beginning of display frame event—e.g., when a display refreshing occurs—the composition engine 220 may send to all applications identified in the application registration list synchronization identification messages (320). The synchronization identification messages (320) may comprise vertical synchronization (VSync) pulses. Upon reception of the synchronization identifications messages (320), the corresponding applications $300_1$-$300_N$ may initiate video content generation and/or updates that are to be displayed. The composition engine 220 may keep track of the applications that are performing content updates, such as by maintaining a pending application counter that is incremented by one for each issued synchronization identification message (320). When the video content updates are complete, the applications $300_1$-$300_N$ may send completion identification messages (330) to the composition engine 220.

The composition engine 220 may keep track of the count of outstanding updates, such as by decrementing the pending application counter every time a completion identification message (330) is received. When the pending application counter reaches zero, indicating that all content updates are complete, the composition engine 220 may trigger video composition operations to enable combining all content updates by applications $300_1$-$300_N$ into a single display frame.

FIG. 4 is a flow chart that illustrates a process for performing coordinating distributed graphics rendering in a multi-window display. Referring to FIG. 4, there is shown a flow chart 400 comprising a plurality of steps which may be performed for coordinating distributed graphics rendering in a multi-window display of an electronic device.

In step 402, it may be determined whether there may be any pending requests, such as request(s) to register for video content updates from one or more applications running in the electronic device. This step may also incorporate determination whether multi-window display operations are available in the electronic device. In this regard, some displays may not support multi-window display operations, and/or even in displays supporting multi-window display operations, such operations may be disabled and/or may be unnecessary in some instances—e.g., to reduce resource consumption and/or use, and/or when particular application is allocated sole control of the screen and/or display operations. In instances where there are no pending requests, the process may loop back, and the check for pending requests may be performed again, such as after a configurable wait period. Returning to step 402, in instances where there may be pending request (and thus multi-window display operations are being performed), the process may proceed to step 404. In step 404, the process may wait for next synchronization pulse, which may indicate the start of a new frame period. In step 406, synchronization signals (e.g., VSync pulses) may be sent to all applications that may be generating video content or updates thereof that are displayed in multi-window manner. In this regard, the recipient applications may correspond to applications that previously registered for content display.

In step 408, completion indications may be received from the applications to which synchronized messages are sent in step 406. In this regard, completion indications may signify that video content generation or updating by the sending application had been completed. In step 410, it may be determine whether all expected completion indications have been received or whether a deadline for generating next frame has been reached. In this regard, reaching the deadline for generating the next frame may be determined based on timeout or timer expiry. In step 412, the next frame may be generated (and displayed thereafter) by compositing video contents corresponding to all applications assigned to the windows in the display, including any video content updates received, which may include all expected updates when generating the frame occurs as result of determination (in step 408) that all completion indications were received. The process may then loop back to step 402, to check again for pending requests, such as after a configurable wait period.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for coordinating distributed graphics rendering in a multi-window display.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed is:

1. A method, comprising:
   in an electronic device that comprises a display and a plurality of applications running on the electronic device:
      displaying in one or more of a plurality of regions of the display, video content corresponding to one or more of the plurality of applications;
      determining a number of pending video content updates based on tracking of a number of vertical synchronization (VSync) signals issued to one or more of the plurality of applications to authorize performing video content updates;
      monitoring updates of video content for each of the one or more of the plurality of regions of the display; and
      generating a frame comprising video content for all of the one or more of the plurality of regions when one or both of the following occurs:
         all the pending video content updates are completed, and
         a frame generation deadline is reached.

2. The method of claim 1, comprising determining that the frame generation deadline is reached based on expiry of timer.

3. The method of claim 2, wherein the timer is configurable.

4. The method of claim 1, comprising determining the one or more of the plurality of applications authorized to perform video content updates based on previously receiving a request to register for video content updates from the one or more of the plurality of applications.

5. The method of claim 1, comprising determining completion of the pending video content updates based on reception of completion notifications from one or more of the plurality of applications performing updates of video content.

6. The method of claim 5, comprising determining that all the pending video content updates are completed when a number of the completion notifications from one or more of the plurality of applications performing updates of video content is equal to a number of the issued VSync signals.

7. An electronic device, comprising:
   a display;
   at least one processor;
   a memory containing executable instructions that when executed by the at least one processor cause the electronic device to perform a method for managing display operations, the method comprising:
      displaying in one or more of a plurality of regions of the display, video content corresponding to one or more of a plurality of applications running in the electronic device;
      determining a number of pending video content updates based on tracking of a number of vertical synchronization (VSync) signals issued to one or more of the plurality of applications to authorize performing video content updates;
      monitoring updates of video content for each of the one or more of the plurality of regions of the display; and
      generating a frame comprising video content for all of the one or more of the plurality of regions when one or both of the following occurs:
         all the pending video content updates are completed, and
         a frame generation deadline is reached.

8. The electronic device of claim 7, comprising determining that the frame generation deadline is reached based on expiry of timer.

9. The electronic device of claim 8, wherein the timer is configurable.

10. The electronic device of claim 7, comprising determining the one or more of the plurality of applications authorized to perform video content updates based on previously receiving a request to register for video content updates from each of the one or more of the plurality of applications.

11. The electronic device of claim 7, comprising determining completion of the pending video content updates based on reception of completion notifications from one or more of the plurality of applications performing updates of video content.

12. The electronic device of claim 11, comprising determining that all the pending video content updates are completed when a number of the completion notifications from one or more of the plurality of applications performing updates of video content is equal to a number of the issued VSync signals.

13. An electronic device, comprising:
- one or more processors that are operable to run a plurality of applications;
- a screen that is operable to support configuring a plurality of display regions, to enable displaying in each of the plurality of display regions video content corresponding to one or more of the plurality of applications;
- a video processor that is operable to process and/or generate video content corresponding to each of the plurality of display regions; and
- a video compositor that is operable to generate video frames for display via the screen, wherein the generation comprises:
  - determining a number of pending video content updates based on vertical synchronization (VSync) signals issued to at least some of the plurality of applications;
  - monitoring updates of video content for each of the plurality of display regions of the display; and
  - generating a frame comprising video content for all of the plurality of display regions when one or both of the following occurs:
    - all the pending video content updates are completed; and
    - a frame generation deadline is reached.

14. The electronic device of claim 13, wherein the video compositor is operable to determine that the frame generation deadline is reached based on expiry of timer.

15. The electronic device of claim 13, wherein the video compositor is operable to determine that all the pending video content updates are completed when a number of completion notifications received from the at least some of the plurality of applications is equal to a number of the issued VSync signals.

* * * * *